(12) United States Patent
Gangi et al.

(10) Patent No.: US 12,019,970 B2
(45) Date of Patent: Jun. 25, 2024

(54) SUPPORT METHOD, DESIGN SUPPORT SYSTEM, AND NON-TRANSITORY COMPUTER-READABLE STORAGE MEDIUM

(71) Applicant: KABUSHIKI KAISHA TOSHIBA, Tokyo (JP)

(72) Inventors: Hiro Gangi, Tokyo (JP); Yasunori Taguchi, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 402 days.

(21) Appl. No.: 17/445,930

(22) Filed: Aug. 25, 2021

(65) Prior Publication Data

US 2022/0180039 A1 Jun. 9, 2022

(30) Foreign Application Priority Data

Dec. 4, 2020 (JP) .................................. 2020-201947

(51) Int. Cl.
*G06F 30/367* (2020.01)
*G06F 30/398* (2020.01)
(Continued)

(52) U.S. Cl.
CPC ............. *G06F 30/398* (2020.01); *G06N 7/01* (2023.01); *G06F 2119/06* (2020.01)

(58) Field of Classification Search
CPC .. G06F 30/398; G06F 2119/06; G06F 30/367; G06F 30/36; G06N 7/01; G06N 20/00
See application file for complete search history.

(56) References Cited

U.S. PATENT DOCUMENTS

| 7,546,231 B2 * | 6/2009 | Kim .................... G06F 30/367 716/106 |
| 2003/0083856 A1 * | 5/2003 | Yoshimura ............ G06F 30/367 703/18 |

(Continued)

OTHER PUBLICATIONS

Chen et al., (Automatic Selection of Structure Parameters of Silicon on Insulator Lateral Power Device Using Bayesian Optimization, IEEE, vol. 41, No. 9, Sep. 2020) (Year: 2020).*

(Continued)

*Primary Examiner* — Nghia M Doan
(74) *Attorney, Agent, or Firm* — Finnegan, Henderson, Farabow, Garrett & Dunner, LLP

(57) ABSTRACT

According to one embodiment, a design support method includes inputting a design value group to a simulator. The design value group includes design values relating to a semiconductor element. The method further includes acquiring a characteristic value group output from the simulator according to the input of the design value group. The characteristic value group includes characteristic values of the semiconductor element. The characteristic values include a first and a second characteristic values respectively indicating an on-resistance and a breakdown voltage. The method further includes calculating an acquisition function of a Bayesian inference from history data including not less than one data set. The data set includes the design value group and a score. The portion of the characteristic value group includes the first and second characteristic values. The method further includes generating a new design value group based on the acquisition function.

15 Claims, 16 Drawing Sheets

(51) Int. Cl.
    *G06N 7/01*     (2023.01)
    *G06N 20/00*     (2019.01)
    *G06F 119/06*     (2020.01)

(56) References Cited

U.S. PATENT DOCUMENTS

2009/0299719 A1* 12/2009 Tsubamoto ............ G06F 30/367 703/14
2019/0019096 A1* 1/2019 Yoshida .............. G06F 16/9024

OTHER PUBLICATIONS

Volpp et al., (Meta-Learning Acquisition Functions for Bayesian Optimization, Stat. ML, Apr. 4, 2019) (Year: 2019).*
Synopsys, Inc., "Optimizer User Guide, Version L—Mar. 2016," 124 pages (Mar. 2016).
P. Chen, et al., "Multiobjective Bayesian Optimization for Active Load Modulation in a Broadband 20-W GaN Doherty Power Amplifier Design," IEEE Trans. on Microwave Theory and Techniques, vol. 65, No. 3, pp. 860-871 (Mar. 2017).
L. Bassman, et al, "Active Learning for accelerated design of layered materials," npj Computation Materials, vol. 4, Art. 74, 9 pages (2018).
Tamaoki et al., "Design Technology for Optical Products Using Simulation Based on Response Surface Method," Toshiba Review, vol. 70, No. 4, pp. 38-41 (2015).
Synopsys, Inc., "Sentaurus™ PCM Studio User Guide, Version O—Dec. 2018," 246 pages (Dec. 2018).
J. Kirschner, et al., "Adaptive and Safe Bayesian Optimization in High Dimensions via One-Dimensional Subspaces," Proc. of the 36$^{th}$ Int'l Conf. on Machine Learning, vol. 97, pp. 3429-3438 (2019).
J. Chen, et al., "Automatic Selection of Structure Parameters of Silicon on Insulator Lateral Power Device Using Bayesian Optimization," IEEE Electron Device Letters, vol. 41, No. 9, pp. 1288-1291 (Sep. 2020).

* cited by examiner

| DESIGN ITEM | SYMBOL |
|---|---|
| CELL PITCH | CP |
| GATE OXIDE FILM THICKNESS | T_G |
| SOURCE DEPTH | D_S |
| BASE DEPTH | D_B |
| GATE LENGTH | L_G |
| GATE DEPTH | D_G |
| SOURCE CONCENTRATION | C_S |
| SUBSTRATE THICKNESS | T_Sub |
| SUBSTRATE CONCENTRATION | C_Sub |
| TRENCH BOTTOM CURVATURE | R_TB |
| CONTACT DEPTH | D_TC |
| CONTACT HALF-WIDTH | W_TC |
| DRIFT LAYER THICKNESS | T_D |
| DRIFT LAYER CONCENTRATION | C_D |
| BASE CONCENTRATION | C_B |
| TRENCH SLOPE ANGLE | Taper |
| TRENCH HALF-WIDTH | W_T |
| GATE-FP DISTANCE | D_GFP |
| FP1 HALF-WIDTH | W_FP1 |
| FP1 LENGTH | L_FP1 |
| FP2 HALF-WIDTH | W_FP2 |
| FP2 LENGTH | L_FP2 |
| TRENCH BOTTOM FP THICKNESS | T_FP |

FIG. 6

| CHARACTERISTIC ITEM | SYMBOL |
|---|---|
| ON-RESISTANCE | RonA |
| BREAKDOWN VOLTAGE (AT GATE VOLTAGE OF 0 V) | Vdss |
| BREAKDOWN VOLTAGE (WHEN APPLYING GATE VOLTAGE) | Vdsx |
| SWITCHING CHARGE | Qsw |
| GATE ACCUMULATED CHARGE | Qg |
| GATE-SOURCE ACCUMULATED CHARGE | Qgs |
| GATE-DRAIN ACCUMULATED CHARGE | Qgd |
| OUTPUT CHARGE | Qoss |
| THRESHOLD | Vth |
| CHANNEL LENGTH | L_Ch |

FIG. 8

| DESIGN VARIABLE NO. | DESIGN ITEM | SYMBOL |
| --- | --- | --- |
| 1 | CELL PITCH | CP |
| 2 | GATE OXIDE FILM THICKNESS | T_G |
| 3 | SOURCE DEPTH | D_S |
| 4 | CHANNEL LENGTH | L_Ch |
| 5 | GATE LENGTH | L_G |
| 6 | GATE DEPTH | D_G |
| 7 | SOURCE CONCENTRATION | C_S |
| 8 | SUBSTRATE THICKNESS | T_Sub |
| 9 | SUBSTRATE CONCENTRATION | C_Sub |
| 10 | TRENCH BOTTOM CURVATURE | R_TB |
| 11 | CONTACT DEPTH | D_TC |
| 12 | CONTACT HALF-WIDTH | W_TC |
| 13 | DRIFT LAYER THICKNESS | T_ |
| 14 | DRIFT LAYER CONCENTRATION | C_ |
| 15 | P-BASE CONCENTRATION | C_P |
| 16 | TRENCH SLOPE ANGLE | Taper |
| 17 | TRENCH HALF-WIDTH | W_T |
| 18 | GATE-FP DISTANCE | D_GFP |
| 19 | FP LENGTH | L_FP |
| 20 | TRENCH BOTTOM FP THICKNESS | T_FP |

FIG. 13

SUPPORT METHOD, DESIGN SUPPORT SYSTEM, AND NON-TRANSITORY COMPUTER-READABLE STORAGE MEDIUM

CROSS-REFERENCE TO RELATED APPLICATIONS

This application is based upon and claims the benefit of priority from Japanese Patent Application No. 2020-201947, filed on Dec. 4, 2020; the entire contents of which are incorporated herein by reference.

FIELD

Embodiments described herein relate generally to a design support method, a design support system, and a non-transitory computer-readable storage medium.

BACKGROUND

It is desirable to develop technology that can support the design of a semiconductor element.

BRIEF DESCRIPTION OF THE DRAWINGS

FIG. 6 is a table illustrating the design items;

FIG. 8 is a table illustrating characteristic items;

FIGS. 12A to 12C, FIG. 13, and FIGS. 14A and 14B are output examples according to the design support system according to the first modification;

DETAILED DESCRIPTION

Figure 1:
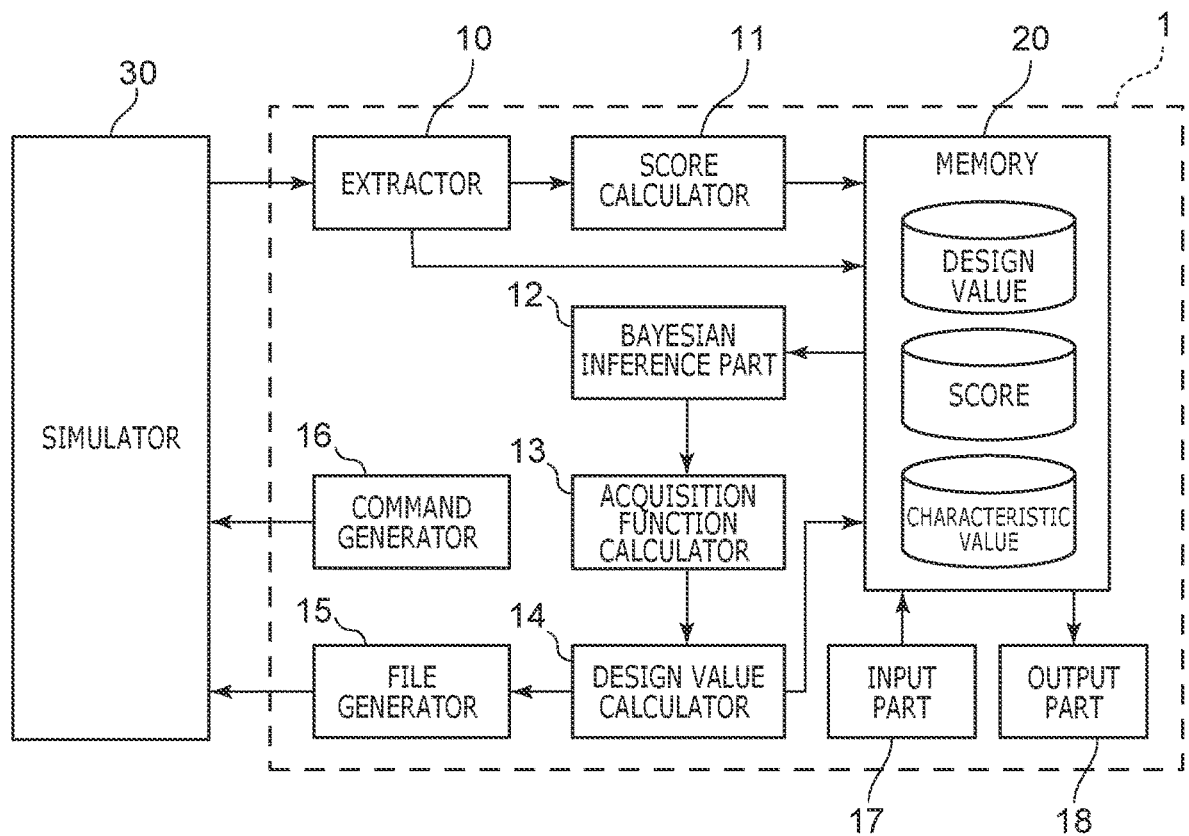
FIG. 1 is a block diagram illustrating a functional configuration of a design support system according to an embodiment.

According to one embodiment, a design support method includes inputting a design value group to a simulator. The design value group includes a plurality of design values relating to a semiconductor element. The design support method further includes acquiring a characteristic value group output from the simulator according to the input of the design value group. The characteristic value group includes a plurality of characteristic values of the semiconductor element. The plurality of characteristic values includes a first characteristic value and a second characteristic value. The first characteristic value indicates an on-resistance. The second characteristic value indicates a breakdown voltage. The design support method further includes calculating an acquisition function of a Bayesian inference from history data including not less than one data set. The data set includes the design value group and a score. The score is calculated by inputting a portion of the characteristic value group to a first function. The portion of the characteristic value group includes the first and second characteristic values. The design support method further includes generating a new design value group based on the acquisition function.

Various embodiments will be described hereinafter with reference to the accompanying drawings. In the specification and drawings, components similar to those described or illustrated in a drawing thereinabove are marked with like reference numerals, and a detailed description is omitted as appropriate.

FIG. 1 is a block diagram illustrating a functional configuration of a design support system according to an embodiment.

The design support system 1 according to the embodiment is used to search for a design value of not less than one design item relating to a semiconductor element. The design support system 1 uses a simulator 30 to search for the design value.

As shown in FIG. 1, the design support system 1 includes an extractor 10, a score calculator 11, a Bayesian inference part 12, an acquisition function calculator 13, a design value calculator 14, a file generator 15, a command generator 16, an input part 17, an output part 18, and memory 20.

The simulator 30 accepts the input of a design value group that relates to the semiconductor element. The design value group includes multiple design values that respectively indicate the values of the multiple design items. The semiconductor element that is the object of the design support system 1 is, for example, a metal oxide semiconductor field effect transistor (MOSFET), an insulated gate bipolar transistor (IGBT), a diode, etc. The design support system 1 is particularly favorable for a power semiconductor element that controls and supplies electrical power. The multiple design items are the impurity concentrations of the semiconductor layers, the thicknesses of the semiconductor layers, the dimensions of the other components, etc.

The simulator 30 outputs a characteristic value group according to the input of the design value group. The characteristic value group includes multiple characteristic values that respectively indicate values of multiple characteristic items. The multiple characteristic items include an on-resistance, a breakdown voltage, a switching charge, etc. The simulator 30 can ascertain what kind of characteristic value group will be obtained when the design value group that is input is actually applied to the semiconductor element.

The extractor 10 extracts a portion of the characteristic values from the characteristic value group when the characteristic value group is output from the simulator 30. The extractor 10 transmits the extracted portion of the characteristic values to the score calculator 11.

The score calculator 11 accesses the memory 20 and acquires a first function. The score calculator 11 calculates a score by inputting the portion of the characteristic values to the first function. The first function is a function for calculating the score from the characteristic values and is preset by a user. The score calculator 11 associates the calculated score with the characteristic value group that includes the characteristic values input to the first function and the design value group that is the basis of the characteristic value group, and stores the result in the memory 20.

The memory 20 stores history data. The history data includes not less than one data set. Each data set includes a combination of the design value group and the score. When a new data set is stored in the memory 20, the Bayesian inference part 12 accesses the memory 20 and acquires the history data obtained up to that time. The Bayesian inference part 12 estimates a surrogate model of the score from the history data and transmits the surrogate model to the acquisition function calculator 13. The acquisition function calculator 13 calculates an acquisition function from the surrogate model of the score. The acquisition function calculator 13 transmits the acquisition function to the design value calculator 14.

The design value calculator 14 calculates a new design value based on the acquisition function. The design value calculator 14 transmits the calculated design values to the file generator 15 together with the calculated design values that are stored in the memory 20.

The file generator 15 generates a file for inputting to the simulator 30. The file includes data of the design value group. For example, the number of new design values calculated by the design value calculator 14 is equal to the number of design values included in the design value group. In such a case, a new design value group is generated by the design value calculator 14. The number of new design values calculated by the design value calculator 14 may be less than the number of design values included in the design value group. When the number of new design values that are calculated is less than the number of design values included in the design value group, the file generator 15 appropriately adds the insufficient design values. In such a case, a new design value group is generated by the file generator 15. The file generator 15 inputs the design value group to the simulator 30.

The command generator 16 generates an execution command to cause the simulator 30 to execute a simulation. The command generator 16 transmits the execution command to the simulator 30 at a prescribed timing.

The simulator 30 executes the simulation by using the design value group input from the file generator 15. The simulator 30 outputs, to the extractor 10, a new characteristic value group obtained as a result of the simulation.

The input part 17 is used by a user to input data. By using the input part 17, the user stores the data necessary for the processing of the design support system 1 in the memory 20.

The output part 18 outputs data indicating at least one selected from the group consisting of a design value, a characteristic value, and a score to the user. For example, the output part 18 displays the iteration number of the processing set that includes inputting the design value group, acquiring the characteristic value group, calculating the score, and generating the new design value group, and displays the relationship with the characteristic values. Hereinbelow, the processing set is also called a "trial". The output part 18 may display a component drawing of the semiconductor element that reflects the design value group after trials are repeatedly executed.

Figure 2:
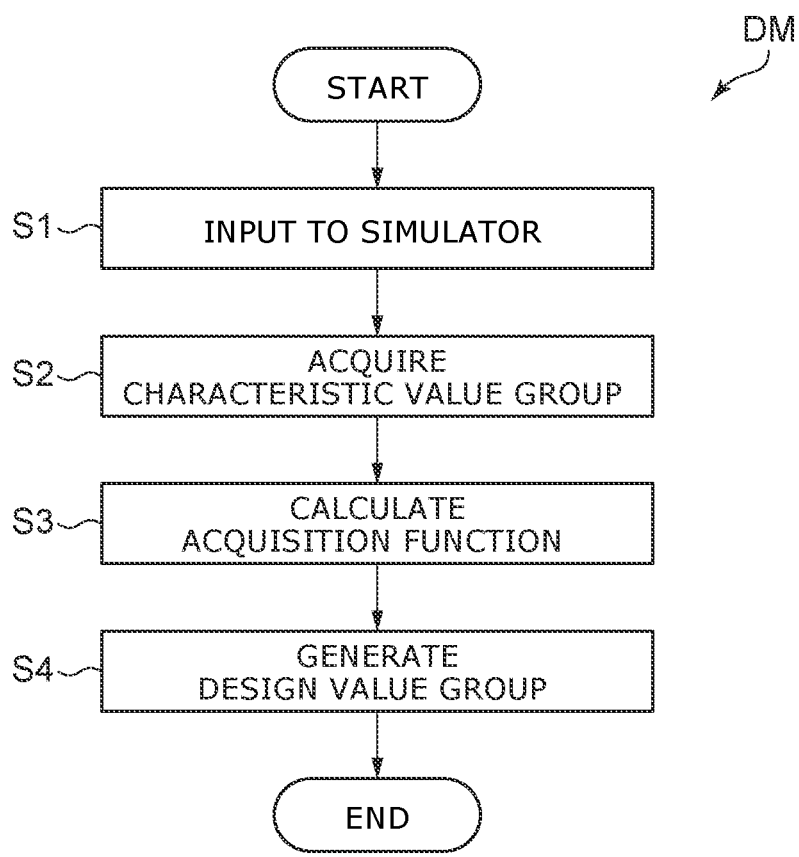
FIG. 2 is a flowchart illustrating a design support method according to the embodiment.

FIG. 2 is a flowchart illustrating a design support method according to the embodiment.

In a design support method DM shown in FIG. 2, the file generator 15 inputs the design value group to the simulator 30 (step S1). The extractor 10 acquires the characteristic value group (step S2). The score calculator 11 inputs a portion of the characteristic value group to the first function and calculates the score. The Bayesian inference part 12 estimates a surrogate model of the score based on a Bayesian inference from the history data that includes not less than one data set of the design value group and the score. The acquisition function calculator 13 calculates the acquisition function from the surrogate model of the score (step S3). The design value calculator 14 generates a new design value group based on the acquisition function (step S4).

The design values of the semiconductor element are searched by repeating the trial that includes steps S1 to S4.

Figure 3:
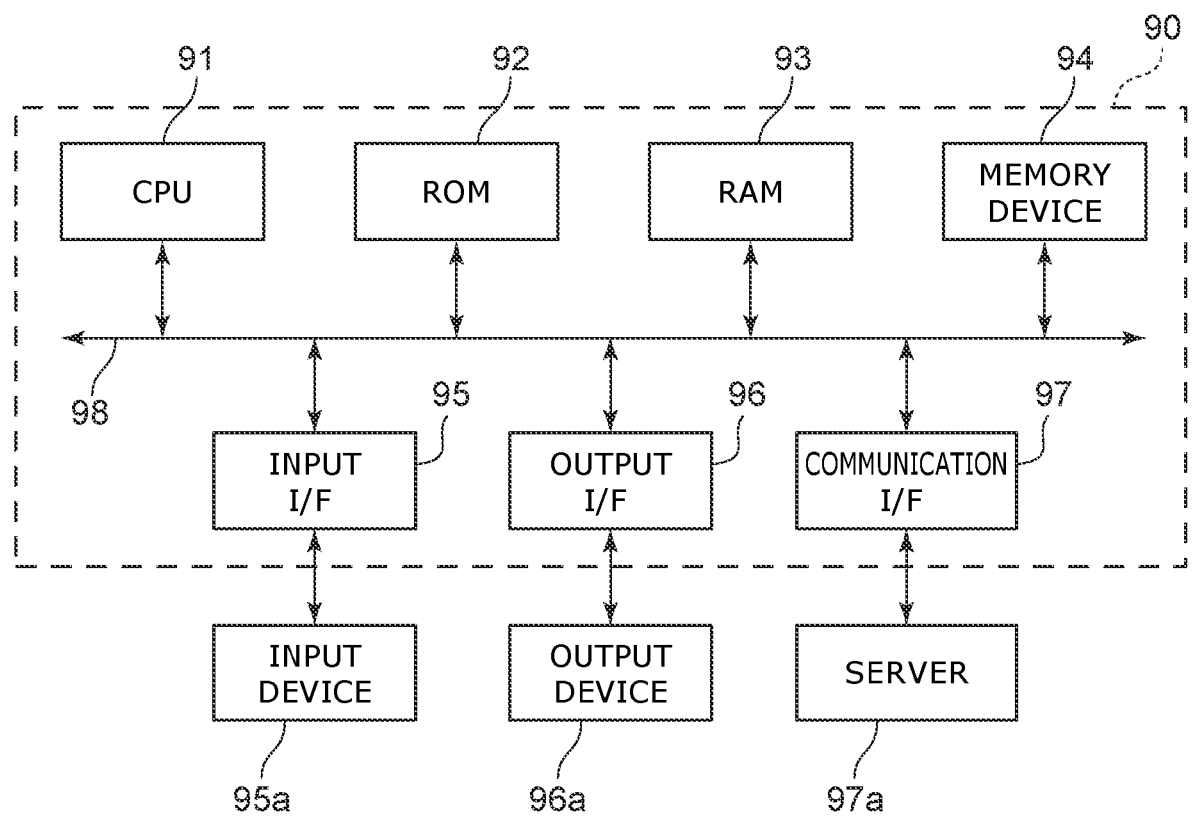
FIG. 3 is a schematic view illustrating a hardware configuration.

FIG. 3 is a schematic view illustrating a hardware configuration.

The design support system 1 according to the embodiment can be realized by the hardware configuration shown in FIG. 3. A processing device 90 shown in FIG. 3 includes a CPU 91, ROM 92, RAM 93, a memory device 94, an input interface 95, an output interface 96, and a communication interface 97.

The ROM 92 stores programs that control the operations of a computer. A program that is necessary for causing the computer to realize the processing described above is stored in the ROM 92. The RAM 93 functions as a memory region into which the programs stored in the ROM 92 are loaded.

The CPU 91 includes a processing circuit. The CPU 91 uses the RAM 93 as work memory to execute the programs stored in at least one of the ROM 92 or the memory device 94. While executing the program, the CPU 91 executes various processing by controlling configurations via a system bus 98.

The memory device 94 stores data necessary for executing the programs and data obtained by executing the programs.

The input interface (I/F) 95 connects the processing device 90 and an input device 95a. The input I/F 95 is, for example, a serial bus interface such as USB, etc. The CPU 91 can read various data from the input device 95a via the input I/F 95.

An output interface (I/F) 96 connects the processing device 90 and an output device 96a. The output I/F 96 is, for example, an image output interface such as Digital Visual Interface (DVI), High-Definition Multimedia Interface (HDMI (registered trademark)), etc. The CPU 91 transmits the data to the output device 96a via the output I/F 96. The output device 96a outputs the data.

A communication interface (I/F) 97 connects the processing device 90 and a server 97a that is outside the processing device 90. The communication I/F 97 is, for example, a network card such as a LAN card, etc. The CPU 91 can read various data from the server 97a via the communication I/F 97.

The memory device 94 includes not less than one selected from a hard disk drive (HDD) and a solid state drive (SSD). The input device 95a includes not less than one selected from a mouse, a keyboard, a microphone (audio input), and a touchpad. The output device 96a includes not less than one selected from a monitor, a printer, a speaker, and a projector. A device such as a touch panel that functions as both the input device 95a and the output device 96a may be used.

For example, the processing device 90 functions as the extractor 10, the score calculator 11, the Bayesian inference part 12, the acquisition function calculator 13, the design value calculator 14, the file generator 15, and the command generator 16 shown in FIG. 1. The memory device 94 functions as the memory 20. The input device 95a functions as the input part 17. The output device 96a functions as the output part 18.

Technology computer-aided design (TCAD) manufactured by Synopsys or TCAD manufactured by SILVACO can be used as the simulator 30. For example, for TCAD manufactured by Synopsys, the Sentaurus Process software and the Sentaurus Device software can be used in combination. For TCAD manufactured by SILVACO, the Athena software and the Atlas software can be used in combination.

Advantages of the embodiment will now be described.

For example, the design values of the semiconductor element are determined by a human by trial and error using a simulator. However, semiconductor elements include many design items; and the load on the human is large. Furthermore, the characteristics of the semiconductor element, and particularly the on-resistance and the breakdown voltage, change due to the effects of the various design items. Therefore, expert knowledge and experience are necessary to evaluate the characteristic values of the design values that are input and to determine the next design values. Also, fluctuation in the evaluation of the characteristic values for the design values occurs according to the human.

According to the embodiment, the input of the design value group to the simulator 30, the acquisition of the characteristic value group from the simulator 30, the evaluation, and the generation of the new design value group are automatically repeated. Therefore, the load on the human can be reduced. The fluctuation of the evaluation of the characteristic values also can be suppressed without requiring expert knowledge and experience.

According to the embodiment, the new design value group is generated based on an acquisition function of Bayesian inference. When Bayesian inference is applied to the design of a semiconductor element that includes many design values, more time is necessary for the initial search compared to response surface methodology or design by a human. However, the inventor discovered that Bayesian inference is particularly favorable for designing a semiconductor element. As a result, it is possible to use Bayesian inference to set more desirable values of the design values of the semiconductor element in a shorter period of time.

The design support system 1 according to the embodiment will now be described with reference to specific examples.

Figure 4:
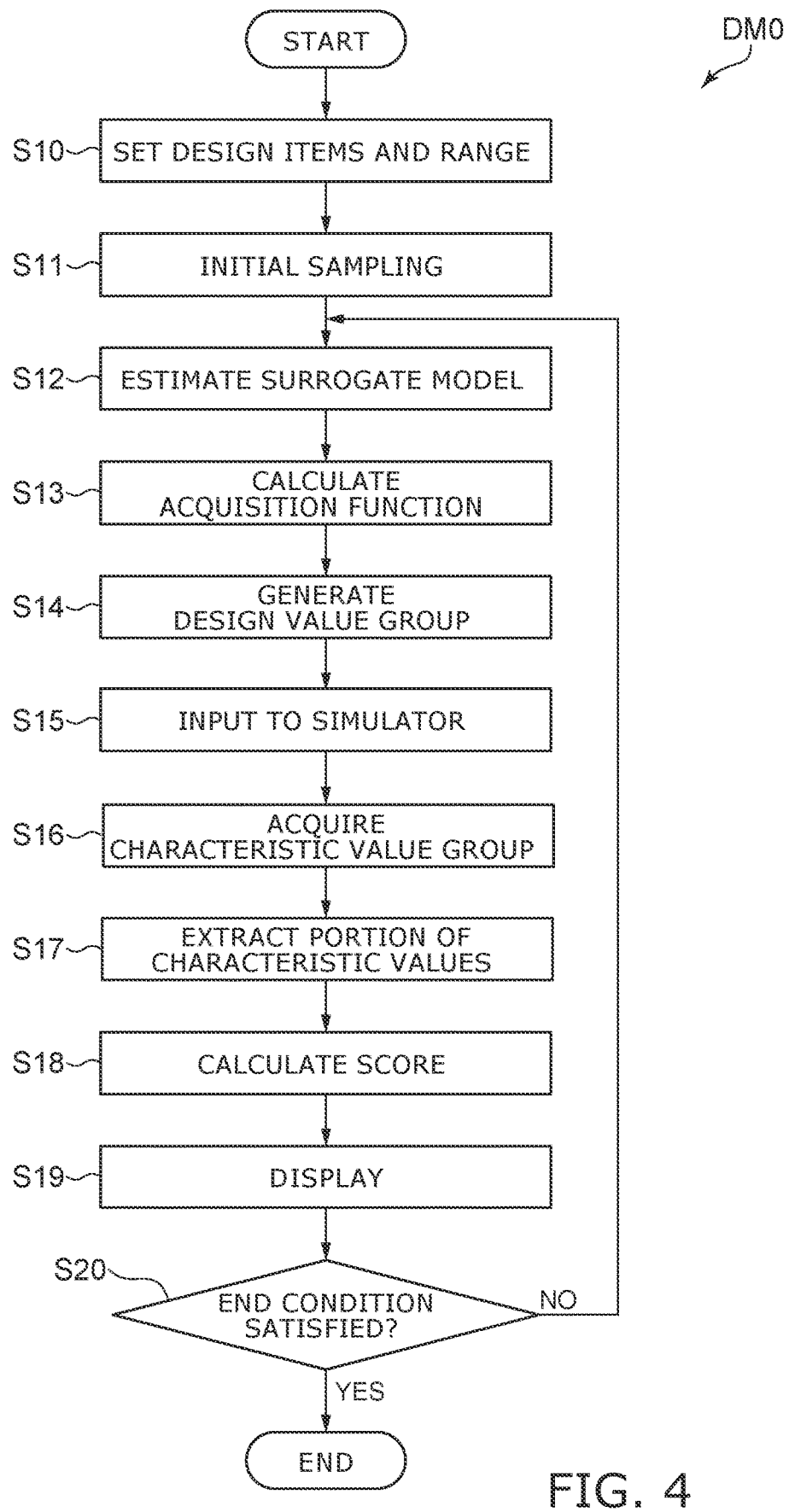
FIG. 4 is a flowchart illustrating the design support method according to the embodiment.

FIG. 4 is a flowchart illustrating the design support method according to the embodiment.

In a design support method DM0 shown in FIG. 4, the user sets the design items to be searched and the search ranges of the design items (step S10). Initial sampling is executed (step S11). In the initial sampling, the design value calculator 14 randomly sets a setting value group; and the file generator 15 inputs the setting value group to the simulator 30. The extractor 10 extracts a portion of the characteristic values from the characteristic value group output by the simulator 30. The score calculator 11 calculates a score based on the extracted portion of the characteristic values. In the initial sampling, a trial that includes inputting the design value group, acquiring the characteristic value group, calculating the score, and generating the new design value group is repeated. For example, the initial sampling is repeated 10 to 30 times. By repeating the initial sampling, data sets of the design value group and the score are repeatedly stored in the memory 20.

The Bayesian inference part 12 estimates a surrogate model of the score from multiple data sets stored in the memory 20 (step S12). The acquisition function calculator 13 calculates an acquisition function from the surrogate model of the score (step S13). The design value calculator 14 generates a new design value group by calculating multiple design values based on the acquisition function (step S14).

The file generator 15 generates a file that includes the design value group and inputs the file to the simulator 30 (step S15). The extractor 10 acquires the characteristic value group output from the simulator 30 (step S16) and extracts a portion of the characteristic values (step S17). The score calculator 11 calculates a score by inputting the extracted portion of the characteristic values to the first function (step S18). The output part 18 displays the result of the trial (step S19). The Bayesian inference part 12 determines whether or not the end conditions are satisfied (step S20). The trial of steps S12 to S19 is repeated until the end condition is satisfied. As an example, the end condition is set to be when the iteration number of steps S12 to S19 reaches a specified count or when the score reaches a preset target value.

The trial that includes generating the design value group in step S14, inputting the design value group in step S15, acquiring the characteristic value group in step S16, and calculating the score in step S18 is repeated. Favorable design values relating to the semiconductor element are searched by repeating the trial.

Figure 5:
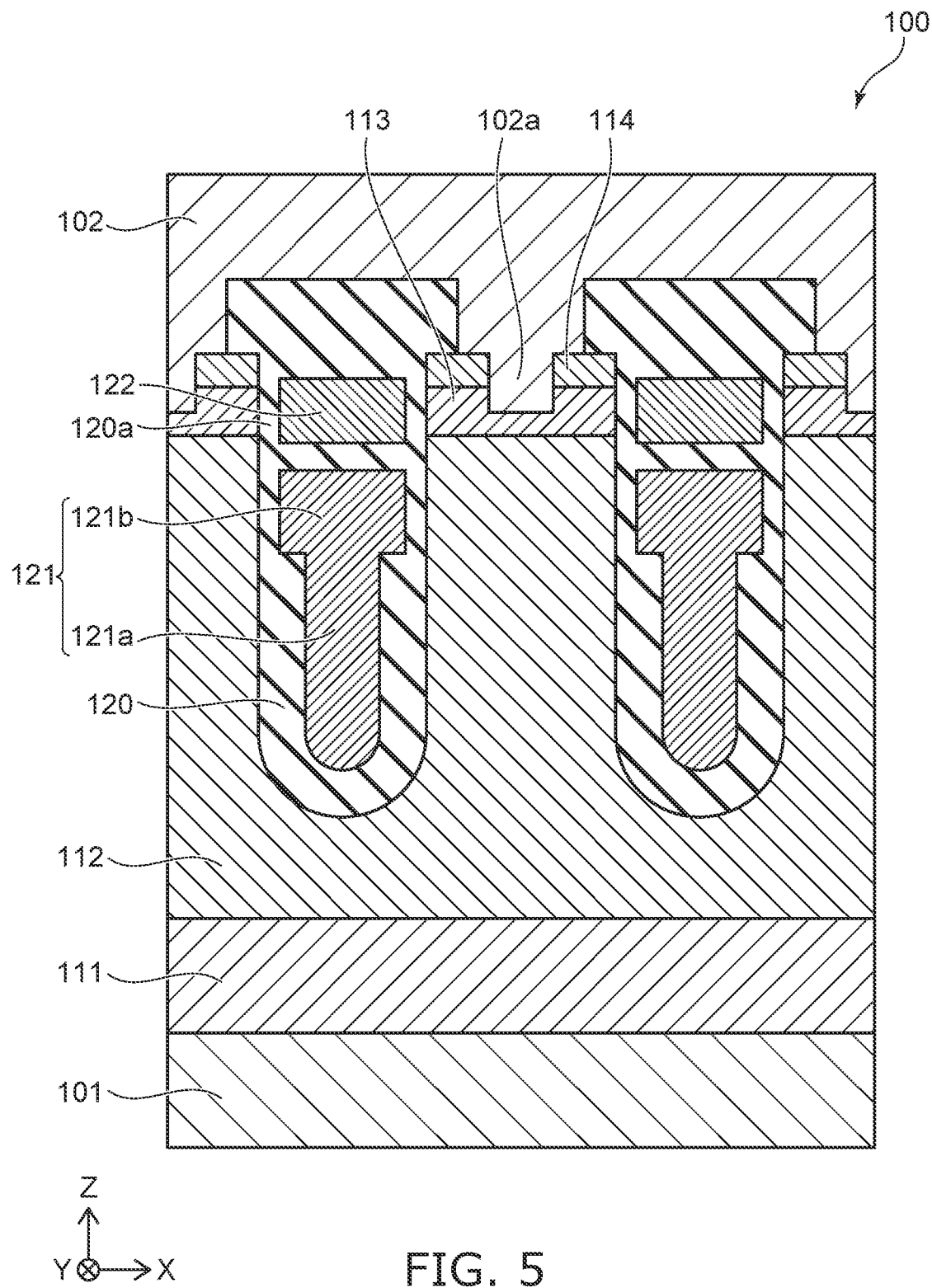
FIG. 5 is a schematic cross-sectional view illustrating a structure of a semiconductor element.

FIG. 5 is a schematic cross-sectional view illustrating a structure of a semiconductor element.

Design values that relate to the structure of the semiconductor element 100 shown in FIG. 5 are searched by the design support system 1 according to the embodiment. The semiconductor element 100 is a MOSFET.

The semiconductor element 100 includes a first electrode 101, a second electrode 102, an n$^+$-type semiconductor layer 111, an n$^-$-type semiconductor layer 112, a p-type semiconductor layer 113, an n$^+$-type semiconductor layer 114, an insulating layer 120, a field plate electrode (hereinbelow, called a FP electrode) 121, and a gate electrode 122. The p-type and the n-type of the semiconductor layers may be inverted.

The first electrode 101 and the second electrode 102 are separated from each other. The direction from the first electrode 101 toward the second electrode 102 is taken as a Z-direction. The n$^+$-type semiconductor layer 111 is located between the first electrode 101 and the second electrode 102. The n$^+$-type semiconductor layer 111 is electrically connected with the first electrode 101. The n$^-$-type semiconductor layer 112 is located between the n$^+$-type semiconductor layer 111 and the second electrode 102. The n-type impurity concentration in the n$^-$-type semiconductor layer 112 is less than the n-type impurity concentration in the n$^+$-type semiconductor layer 111. The p-type semiconductor layer 113 is located between the n$^-$-type semiconductor layer 112 and the second electrode 102. The n$^+$-type semiconductor layer 114 is located between the p-type semiconductor layer 113 and the second electrode 102.

The insulating layer 120 is located between the n$^+$-type semiconductor layer 111 and the second electrode 102 in the Z-direction. The insulating layer 120 is arranged with a portion of the n$^-$-type semiconductor layer 112, the p-type semiconductor layer 113, and a portion of the n$^+$-type semiconductor layer 114 in an X-direction that is perpendicular to the Z-direction. A portion of the insulating layer 120 is located around the FP electrode 121. The direction from a portion of the n$^-$-type semiconductor layer 112 toward the FP electrode 121 is along the X-direction. The gate electrode 122 is located between the FP electrode 121 and the second electrode 102 in the Z-direction. Another portion of the insulating layer 120 is located around the gate electrode 122. The direction from the gate electrode 122 toward the p-type semiconductor layer 113 and the n$^+$-type semiconductor layer 114 is along the X-direction. The second electrode 102 is electrically connected with the p-type semiconductor layer 113, the n+-type semiconductor layer 114, and the FP electrode 121 and is electrically isolated from the gate electrode 122.

In the semiconductor element 100, the FP electrode 121 includes a first portion 121a and a second portion 121b. The second portion 121b is located between the first portion 121a and the gate electrode 122. The width (the length in the X-direction) of the second portion 121b is greater than the width of the first portion 121a. The gate electrode 122 is separated from the FP electrode 121 and electrically isolated from the FP electrode 121. The second electrode 102 includes a contact portion 102a. The contact portion 102a protrudes toward the p-type semiconductor layer 113.

A voltage that is not less than a threshold is applied to the gate electrode 122 in a state in which a positive voltage with respect to the second electrode 102 is applied to the first electrode 101. Thereby, a channel (an inversion layer) is formed in the p-type semiconductor layer 113; and the semiconductor element 100 is set to an on-state. Electrons pass through the channel and flow from the second electrode 102 toward the first electrode 101. When the voltage that is applied to the gate electrode 122 drops below the threshold, the channel in the p-type semiconductor layer 113 disappears, and the semiconductor element 100 is set to an off-state.

When the semiconductor element 100 is switched to the off-state, a positive voltage with respect to the second electrode 102 that is applied to the first electrode 101 increases. At this time, a depletion layer spreads toward the n−-type semiconductor layer 112 from the interface between the insulating layer 120 and the n−-type semiconductor layer 112. The breakdown voltage of the semiconductor element 100 can be increased by the spreading of the depletion layer. Or, the n-type impurity concentration in the n−-type semiconductor layer 112 can be increased while maintaining the breakdown voltage of the semiconductor element 100, and the on-resistance of the semiconductor element 100 can be reduced.

Figure 7:
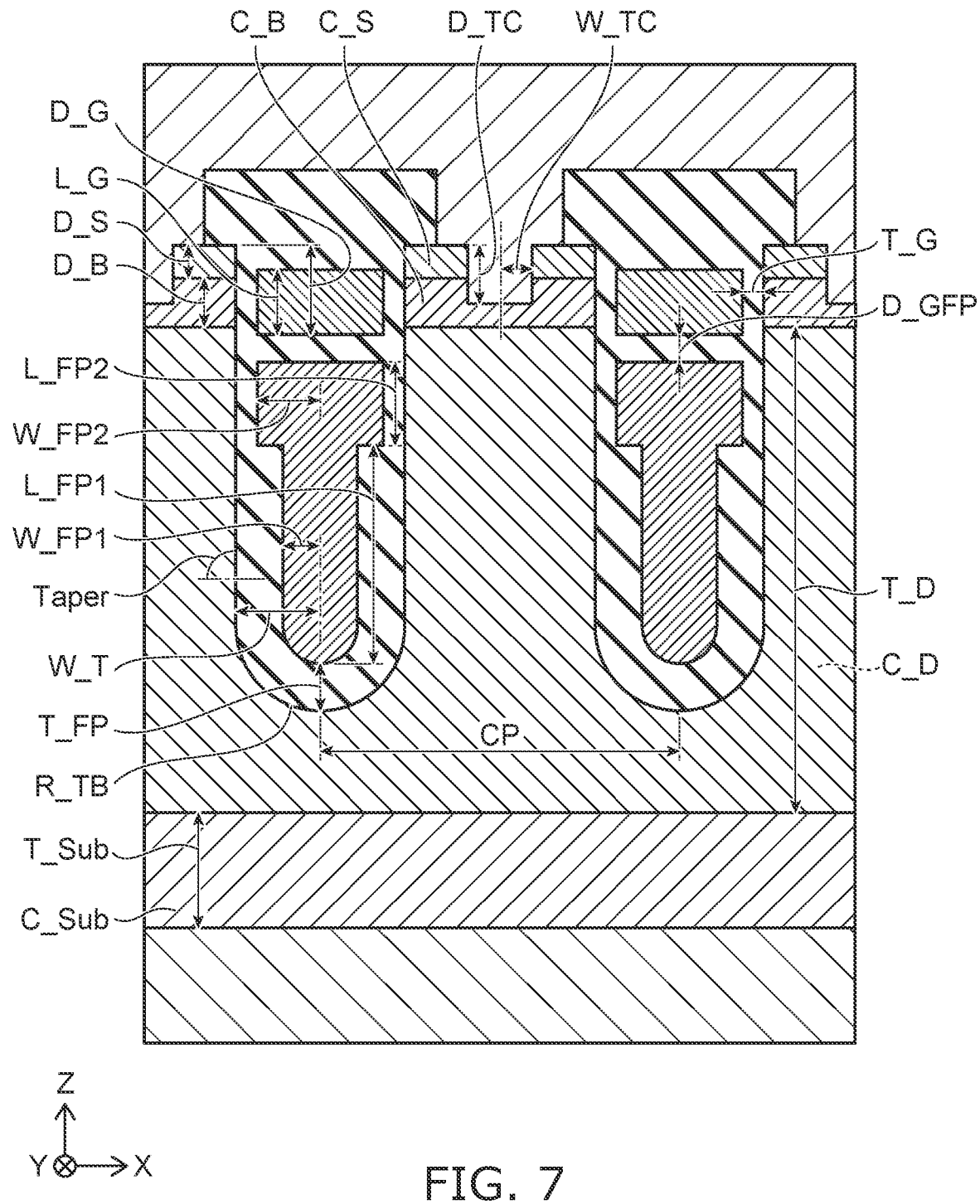
FIG. 7 is a schematic view showing correspondence between the design items and the semiconductor element.

FIG. 6 is a table illustrating the design items. FIG. 7 is a schematic view showing correspondence between the design items and the semiconductor element.

The cell pitch in the table of FIG. 6 corresponds to a pitch CP in the X-direction of the gate electrode 122 (shown in FIG. 7). The gate oxide film thickness corresponds to a thickness T_G in the X-direction of a gate insulating layer 120a. The source depth corresponds to a depth D_S in the Z-direction of the n+-type semiconductor layer 114. The base depth corresponds to a depth D_B in the Z-direction from the boundary between the p-type semiconductor layer 113 and the n+-type semiconductor layer 114 to the boundary between the p-type semiconductor layer 113 and the n−-type semiconductor layer 112. The gate length corresponds to a length L_G in the Z-direction of the gate electrode 122. The gate depth corresponds to a depth D_G in the Z-direction from the upper surface of the n+-type semiconductor layer 114 to the lower end of the gate electrode 122. The source concentration corresponds to an n-type impurity concentration C_S in the n+-type semiconductor layer 114. The substrate thickness corresponds to a thickness T_Sub in the Z-direction of the n+-type semiconductor layer 111. The substrate concentration corresponds to an n-type impurity concentration C_Sub in the n+-type semiconductor layer 111. The trench bottom curvature corresponds to a curvature R_TB at the lower end of the insulating layer 120. The contact depth corresponds to a depth D_TC in the Z-direction from the upper surface of the n+-type semiconductor layer 114 to the lower end of the contact portion 102a. The contact half-width corresponds to a half W_TC of the width of the contact portion 102a. The drift layer thickness corresponds to a thickness T_D in the Z-direction of the n−-type semiconductor layer 112. The drift layer concentration corresponds to an n-type impurity concentration C_D in the n−-type semiconductor layer 112. The base concentration corresponds to a p-type impurity concentration C_B in the p-type semiconductor layer 113. The trench taper angle corresponds to an angle Taper between the side surface of the insulating layer 120 and the X-direction. The trench half-width corresponds to a half W_T of the width of the insulating layer 120. The gate-FP distance corresponds to a distance D_GFP in the Z-direction between the FP electrode 121 and the gate electrode 122. The FP1 half-width corresponds to a half W_FP1 of the width of the first portion 121a. The FP1 length corresponds to a length L_FP1 in the Z-direction of the first portion 121a. The FP2 half-width corresponds to a half W_FP2 of the width of the second portion 121b. The FP2 length corresponds to a length L_FP2 in the Z-direction of the second portion 121b. The trench bottom FP thickness corresponds to a thickness T_FP in the Z-direction of the lower end of the insulating layer 120.

FIG. 8 is a table illustrating characteristic items.

In the table of FIG. 8, an on-resistance RonA is the on-resistance per unit area when a voltage that is greater than the threshold is applied to the gate electrode 122 and the semiconductor element 100 is in the on-state. A breakdown voltage Vdss is the breakdown voltage of the semiconductor element 100 when the voltage of the gate electrode 122 with respect to the second electrode 102 is set to 0 V. A breakdown voltage Vdsx is the breakdown voltage of the semiconductor element 100 when the voltage of the gate electrode 122 with respect to the second electrode 102 is set to −20 V. A switching charge Qsw is the total amount of the charge accumulated in the gate electrode 122 in the switching state of the semiconductor element 100 when the gate voltage is not less than a threshold Vth and not more than the mirror voltage. A gate accumulated charge Qg is the charge amount accumulated in the gate electrode 122 when the semiconductor element 100 is in the on-state. A gate-source accumulated charge Qgs is a portion of the charge amount accumulated between the gate electrode 122 and the source electrode 102 when the semiconductor element 100 is in the on-state. A gate-drain accumulated charge Qgd is a portion of the charge amount accumulated between the gate electrode 122 and the drain electrode 101 when the semiconductor element 100 is in the on-state. An output charge Qoss is a portion of the charge amount accumulated in the drain electrode when the semiconductor element 100 is in the off-state. The threshold Vth is the voltage applied to the gate electrode 122 that is necessary to form the channel (the inversion layer) in the p-type semiconductor layer 113. A channel length L_Ch is the length along the Z-direction from the boundary between the p-type semiconductor layer 113 and the n+-type semiconductor layer 114 to the boundary between the p-type semiconductor layer 113 and the n−-type semiconductor layer 112.

Twenty-three design items exist in the example of FIG. 6. The design support method according to the embodiment is applicable to the twenty-three design items. Twelve characteristic items exist in the example of FIG. 8. A portion of the characteristic items is extracted from these characteristic items. The design items are searched to obtain a better score for the extracted portion of the characteristic items. For example, the portion of the characteristic items includes the on-resistance and the breakdown voltage.

The first function outputs a score according to the input of the characteristic values of the portion of the characteristic items. As an example, a first function f(x) is represented by the following Formula 1. The characteristic value (a first characteristic value) of the on-resistance RonA, the characteristic value (an example of a second characteristic value) of the breakdown voltage Vdss, and the characteristic value (another example of the second characteristic value) of the breakdown voltage Vdsx are input to the first function f(x).

$$F(x) = (1/30) \times RonA + 10 \times (ReLU(110 - Vdss) + ReLU(90 - Vdsx))$$ Formula 1

In Formula 1, "1/30" and "10" are values that are appropriately set by the user. ReLU is a ramp function. "110" is the target value of Vdss. The "90" is the target value of Vdsx. The scores of the characteristic values of RonA, Vdss, and Vdsx are obtained by inputting RonA, Vdss, and Vdsx output from the simulator 30 into Formula 1.

For example, by using Formula (1) as the first function, 1000 trials are executed for all of the design items illustrated in FIG. 6. This search makes it possible to search design values that realize characteristics equal to the design values discovered by an expert. By executing more trial iterations, it is possible to search design values that realize characteristics that are superior to those of an expert.

As described above, the characteristics of the semiconductor element change due to the effects of the various design items. For example, generally, among the characteristics of the semiconductor element, the on-resistance and the breakdown voltage are considered important. The on-resistance is affected by the concentrations of the semiconductor layers, the thicknesses of the semiconductor layers, etc. In particular, the impurity concentration (the drift layer concentration) in the $n^-$-type semiconductor layer 112 affects the on-resistance. The on-resistance decreases as the impurity concentration in the $n^-$-type semiconductor layer 112 increases. On the other hand, the breakdown voltage increases as the impurity concentration in the $n^-$-type semiconductor layer 112 decreases. The on-resistance and the breakdown voltage have a trade-off relationship for a portion of the design items.

When the goal is to improve the characteristic values, there are also cases where the design items affect each other. For example, the $n^-$-type semiconductor layer 112 between the insulating layers 120 is easily depleted when the cell pitch is narrow. Therefore, the breakdown voltage can be increased. Or, by increasing the impurity concentration in the $n^-$-type semiconductor layer 112 to match the ease of the depletion of the $n^-$-type semiconductor layer 112 between the insulating layers 120, it is also possible to reduce the on-resistance while maintaining the breakdown voltage. In other words, the design value of the cell pitch may affect the impurity concentration in the $n^-$-type semiconductor layer 112.

Even for an expert, a large amount of labor is necessary to appropriately set multiple design items that affect both the on-resistance and the breakdown voltage while paying attention to the on-resistance and the breakdown voltage obtained from the simulator 30. According to the embodiment, it is possible to search for favorable design values for both the on-resistance and the breakdown voltage without requiring a detailed investigation by a human.

In the example, each of the design values are searched for the multiple design items shown in FIG. 6. A portion of the design values of the multiple design items shown in FIG. 6 may be searched, and fixed values may be set for the other design items. The impurity concentration in the $n^-$-type semiconductor layer 112 greatly affects the on-resistance and the breakdown voltage. Therefore, it is favorable for the impurity concentration in the $n^-$-type semiconductor layer 112 to be an object of the search.

Figure 9:
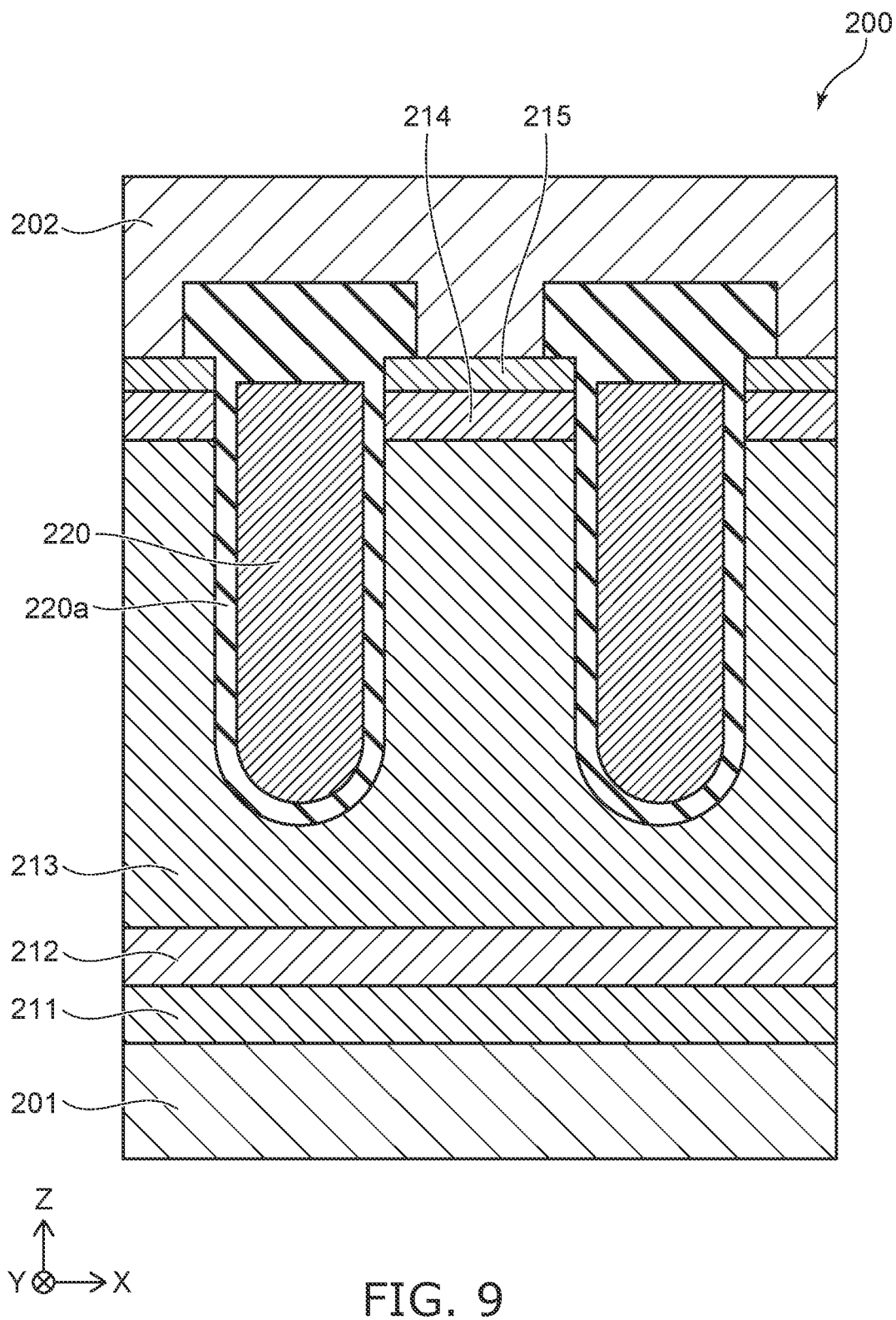
FIG. 9 is a schematic cross-sectional view illustrating the structure of another semiconductor element.

FIG. 9 is a schematic cross-sectional view illustrating the structure of another semiconductor element.

The design values relating to the structure of the semiconductor element 200 shown in FIG. 9 may be searched by the design support system 1 according to the embodiment. The semiconductor element 200 is an IGBT.

The semiconductor element 200 includes a first electrode 201, a second electrode 202, a $p^+$-type semiconductor layer 211, an n-type semiconductor layer 212, an $n^-$-type semiconductor layer 213, a p-type semiconductor layer 214, an $n^+$-type semiconductor layer 215, and a gate electrode 220. The p-type and the n-type of the semiconductor layers may be inverted.

The first electrode 201 and the second electrode 202 are separated from each other. The direction from the first electrode 201 toward the second electrode 202 is taken as the Z-direction. The $p^+$-type semiconductor layer 211 is located between the first electrode 201 and the second electrode 202. The $p^+$-type semiconductor layer 211 is electrically connected with the first electrode 201. The n-type semiconductor layer 212 is located between the $p^+$-type semiconductor layer 211 and the second electrode 202. The $n^-$-type semiconductor layer 213 is located between the n-type semiconductor layer 212 and the second electrode 202. The n-type impurity concentration in the $n^-$-type semiconductor layer 213 is less than the n-type impurity concentration in the n-type semiconductor layer 212. The p-type semiconductor layer 214 is located between the $n^-$-type semiconductor layer 213 and the second electrode 202. The $n^+$-type semiconductor layer 215 is located between the p-type semiconductor layer 214 and the second electrode 202.

The gate electrode 220 is located between the n-type semiconductor layer 212 and the second electrode 202 in the Z-direction. The direction from a portion of the $n^-$-type semiconductor layer 213, the p-type semiconductor layer 214, and a portion of the $n^+$-type semiconductor layer 215 toward the gate electrode 220 is along the X-direction. A gate insulating layer 220a is located between the $n^-$-type semiconductor layer 213 and the gate electrode 220, between the p-type semiconductor layer 214 and the gate electrode 220, and between the $n^+$-type semiconductor layer 215 and the gate electrode 220. The second electrode 202 is electrically connected with the p-type semiconductor layer 214 and the $n^+$-type semiconductor layer 215 and is electrically isolated from the gate electrode 220.

A voltage that is not less than a threshold is applied to the gate electrode 220 in a state in which a positive voltage with respect to the second electrode 202 is applied to the first electrode 201. Thereby, a channel (an inversion layer) is formed in the p-type semiconductor layer 214. Electrons pass through the channel and flow in the $n^-$-type semiconductor layer 213 from the second electrode 202. Holes pass through the $p^+$-type semiconductor layer 211 and flow in the $n^-$-type semiconductor layer 213 from the first electrode 201. Conductivity modulation occurs in the $n^-$-type semiconductor layer 213; and the electrical resistance of the $n^-$-type semiconductor layer 213 decreases. Thereby, the semiconductor element 200 is set to the on-state. When the voltage that is applied to the gate electrode 220 drops below the threshold, the channel in the p-type semiconductor layer 214 disappears, and the semiconductor element 200 is set to the off-state.

Similarly to the semiconductor element 100, the impurity concentrations in the semiconductor layers, the thicknesses of the semiconductor layers, and the dimensions of the other components can be searched by the design support system 1 according to the embodiment for the semiconductor element 200 shown in FIG. 9. For example, the n-type impurity concentration (the drift layer concentration) in the n⁻-type semiconductor layer 213, the thickness (the drift layer thickness) in the Z-direction of the n⁻-type semiconductor layer 213, the pitch (the cell pitch) in the X-direction of the gate electrode 220, the thickness (the gate oxide film thickness) in the X-direction of the gate insulating layer 220a, the depth (the source depth) in the Z-direction of the n⁺-type semiconductor layer 215, the length (the channel length) in the Z-direction of the p-type semiconductor layer 214, the length (the gate length) in the Z-direction of the gate electrode 220, the depth (the gate electrode depth) in the Z-direction from the upper surface of the n⁺-type semiconductor layer 215 to the lower end of the gate electrode 220, the n-type impurity concentration (the source concentration) in the n⁺-type semiconductor layer 215, the curvature (the trench bottom curvature) at the lower end of the gate insulating layer 220a, the angle (the trench taper angle) between the side surface of the gate insulating layer 220a and the X-direction, half (the trench half-width) of the width of the gate insulating layer 220a, etc., can be searched.

First Modification

Figure 10:
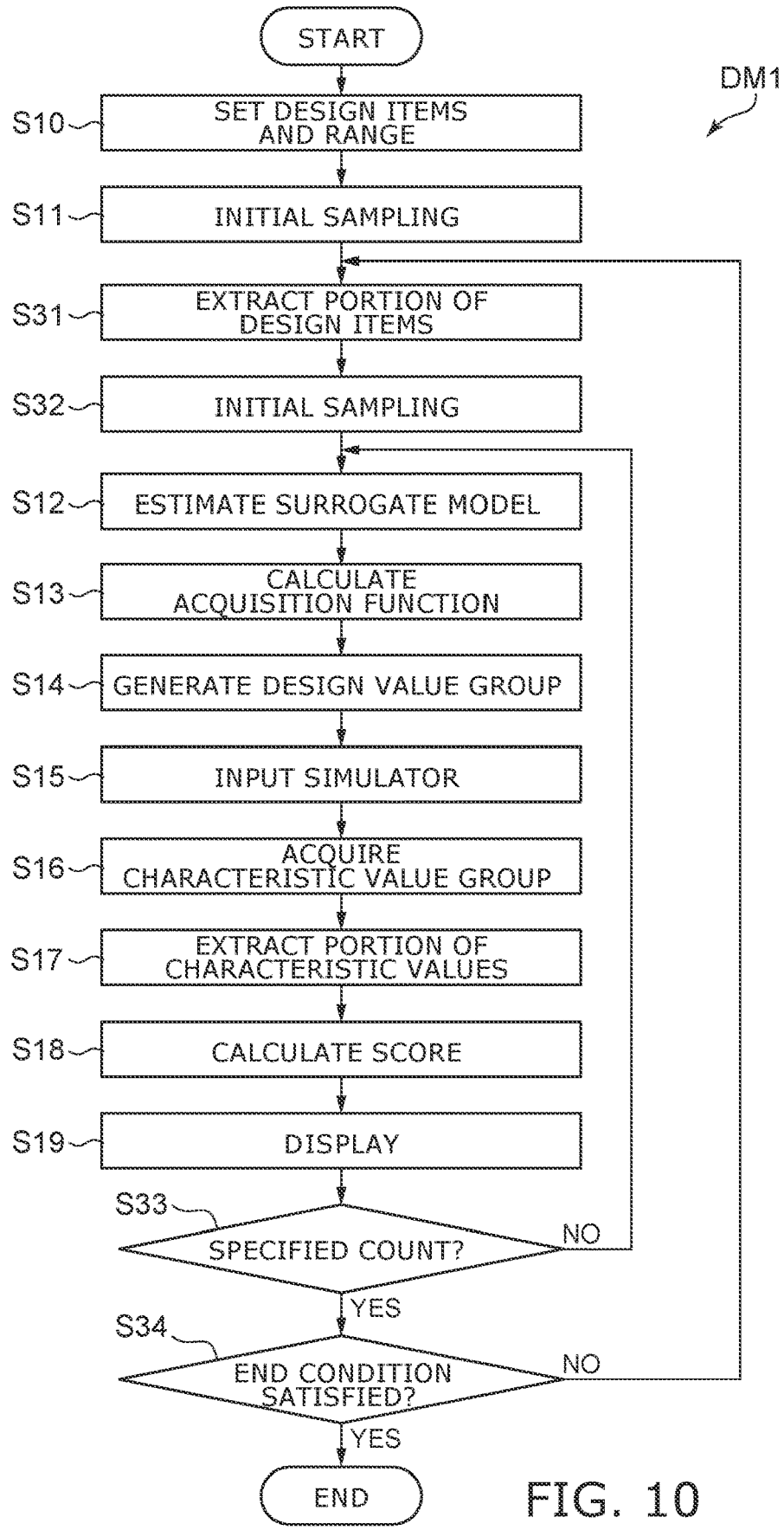
FIG. 10 is a flowchart illustrating a design support method according to a first modification of the embodiment.

FIG. 10 is a flowchart illustrating a design support method according to a first modification of the embodiment.

In the design support method DM0 shown in FIG. 4, the design values of all of the design items may be modified in the trial of one iteration. In a design support method DM1 according to the first modification of shown in FIG. 10, only a portion of the design values is modified in the trial of one iteration.

In the design support method DM1 shown in FIG. 10, steps S10 and S11 are executed similarly to the design support method DM0 shown in FIG. 4. The design value calculator 14 extracts a portion of the design items from the multiple design items (step S31). Initial sampling is executed for the extracted design items (step S32). In the initial sampling, the design value calculator 14 randomly sets the design values of the extracted setting items. The design value that obtained the best score in the initial sampling of step S11 is set for the remaining design items that were not extracted. The design value calculator 14 generates a design value group. The file generator 15 inputs a setting value group to the simulator 30. The extractor 10 extracts a portion of the characteristic values from the characteristic value group output by the simulator 30. The score calculator 11 calculates the score based on the extracted portion of the characteristic values. In the initial sampling of step S32, a trial that includes inputting the design value group, acquiring the characteristic value group, calculating the score, and generating the new design value group is repeated. For example, the initial sampling of step S32 is repeated 3 to 10 iterations. The data sets of the design value group and the score obtained by repeating the initial sampling are stored in the memory 20.

After step S32, steps S12 to S19 are executed similarly to the flowchart shown in FIG. 4. The Bayesian inference part 12 determines whether or not the trial iterations of steps S12 to S18 have reached the specified count (step S33). When the trial iterations have reached specified count, the design value calculator 14 determines whether or not the end condition is satisfied (step S34). Steps S31, S32, and S12 to S19, and S33 are repeated until the end condition is satisfied.

When the end condition is not satisfied, step S31 is re-performed; and a portion of the multiple design items is re-extracted. At least a portion of the extracted design items may be different from at least a portion of the design items extracted in step S31 directly before, or may be the same as at least a portion of the design items extracted in step S31 directly before.

As an example, the end condition is set to be when the iteration number of steps S31, S32, S12 to S19, and S33 has reached a specified count, or when the score has reached a preset target value. For example, when the specified count is 1000 in step S34, the specified count in step S33 is set in the range of 10 to 30.

For example, in the design support method DM1, a first processing set is executed for a portion of the design values; and a second processing set is executed for another portion of the design values. In the first processing set, the portion of the design values is calculated based on the acquisition function. The remaining design values are fixed to the value for which the best score is obtained. A new design value group that includes the calculated portion of the design values and the fixed remaining design values is generated. The portion of the design values is searched by executing multiple first processing sets. The other portion of the design values is calculated based on the acquisition function in the second processing set. The remaining design values are fixed to the value for which the best score is obtained. A new design value group that includes the calculated other portion of the design values and the fixed remaining design values is generated. The other portion of the design values are searched by executing multiple second processing sets.

According to the design support method DM1 according to the first modification, there is a possibility that a local optimal solution may be obtained because only a portion of the design items is modified in the trial of one iteration. For example, there is a possibility that the characteristics of the design values obtained by the design support method DM1 may degrade compared to when the trials of the design support method DM0 are executed for an extremely large number of iterations. However, the inventor discovered that compared to the design support method DM0, better characteristic values are easily obtained within the range of trial iterations that actually can be executed according to the design support method DM1. In particular, it is favorable for only one design item to be extracted in step S31, and for the trial to be sequentially executed for one design value. Thereby, it is possible to obtain better characteristic values in a shorter period of time within a limited range of trial iterations.

Figure 11:
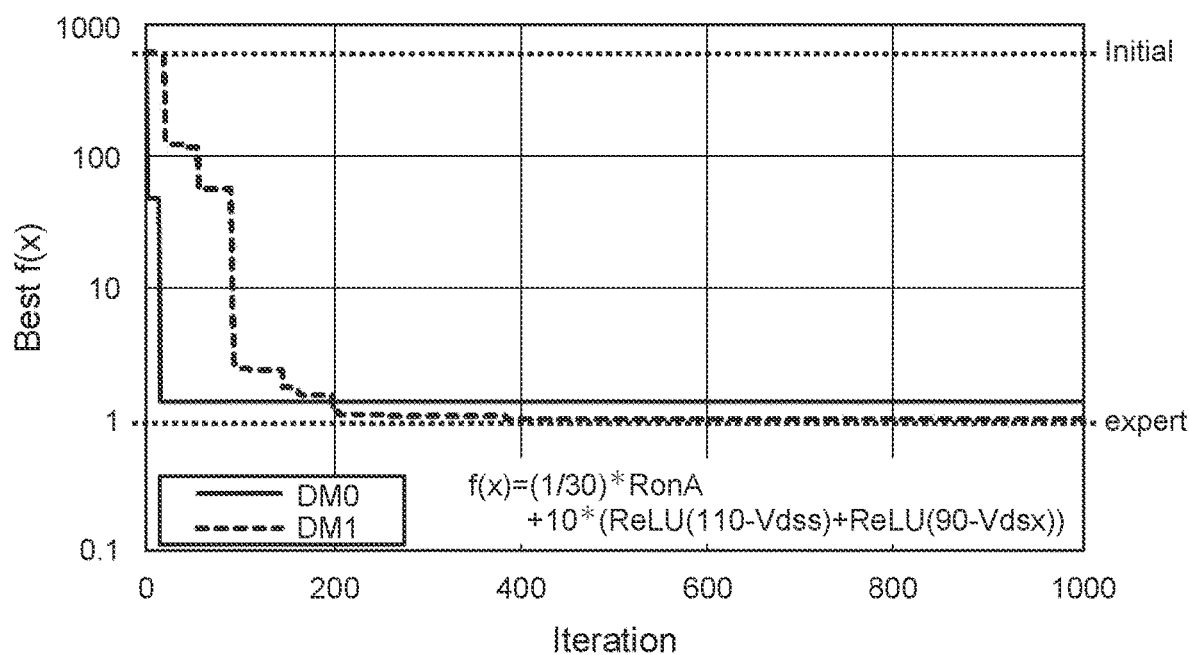
FIG. 11 is a graph illustrating results according to the design support methods according to the embodiment and the first modification.

FIG. 11 is a graph illustrating results according to the design support methods according to the embodiment and the first modification.

FIG. 11 shows the results when the multiple design items are searched using the design support methods according to the embodiment and the first modification. In the design support method according to the first modification, the number of design items extracted in step S31 is set to "1". In FIG. 11, the horizontal axis is the trial iterations. The vertical axis is the minimum score (the best score) output from the first function up to that trial.

The solid line shows the result according to the design support method DM0 shown in FIG. 4. The dashed line shows the result according to the design support method DM1 shown in FIG. 10. The function f(x) in the graph is the first function. When the trial iterations are low, the design support method DM0 obtains a smaller score more quickly than the design support method DM1. However, when the trial iterations exceed 200, the design support method DM1 obtains a smaller score than the design support method DM0.

In FIG. 11, the dotted line shows the score of the design values designed by an expert spending a long period of time. The score is set to "1". When the trial iterations reaches 400, the score according to the design support method DM1 reaches substantially "1". In the design support method DM1 it is also possible for the score to fall below "1" by further increasing the trial iterations.

The output part 18 may display a graph that illustrates the relationship between the trial iterations and the score such as that shown in FIG. 11. The user can easily ascertain how the score improves according to the trial iterations.

FIGS. 12A to 12C, FIG. 13, and FIGS. 14A and 14B are output examples according to the design support system according to the first modification.

Figure 12A:
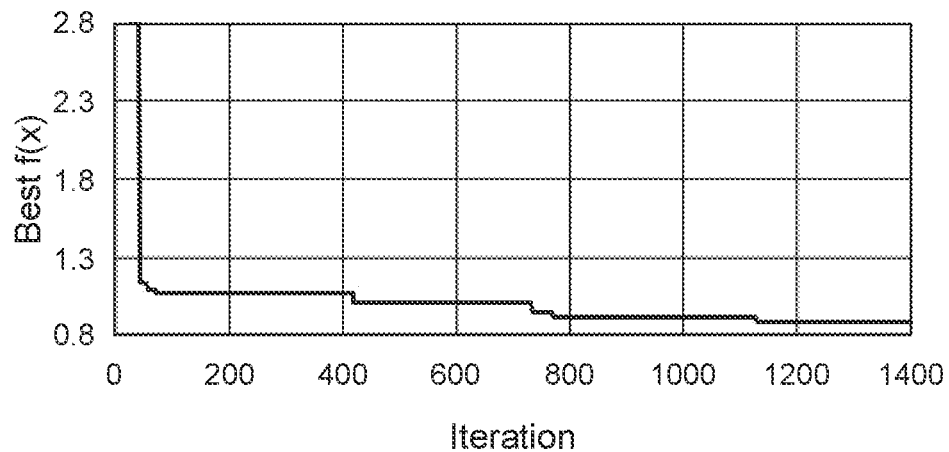
Figure 12B:
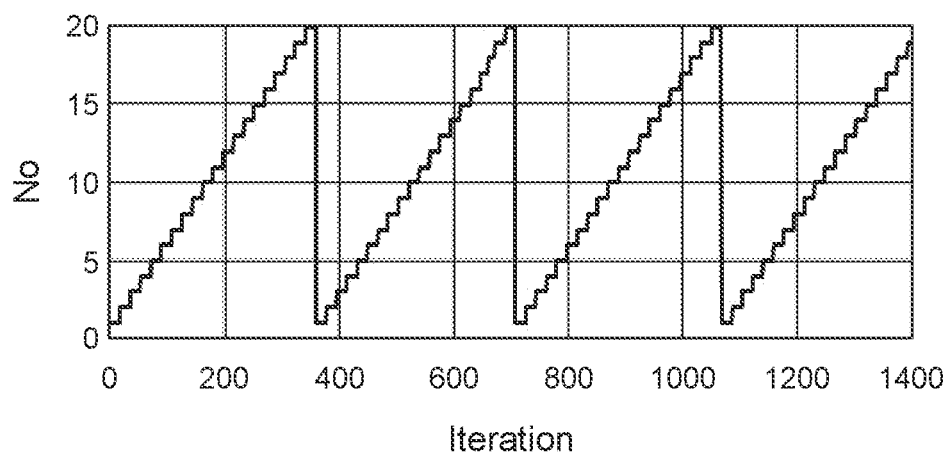
Figure 12C:
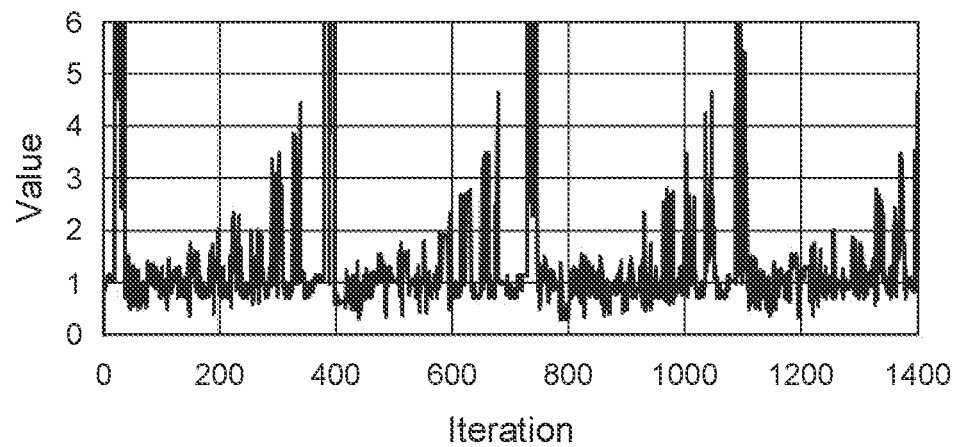

The design support system 1 executes the design support method according to the first modification for the multiple design items shown in FIG. 13. The number of design items extracted in step S31 is set to "1". FIGS. 12A to 12C are graphs that are displayed by the output part 18.

In FIGS. 12A to 12C, the horizontal axis is the trial iterations. The vertical axis of the graph of FIG. 12A is the minimum score (the best score) when the trial iterations shown on the horizontal axis are executed. The vertical axis of the graph of FIG. 12B shows the identification numbers of the extracted design items among the multiple design items included in the table shown in FIG. 13. The vertical axis of the graph of FIG. 12C is the design values of the extracted design items. The multiple design values may be normalized to be displayed with the same number of digits.

By displaying the graph shown in FIG. 12A, the user can easily ascertain how the score is improved according to the trial iterations. In addition to the graph of FIG. 12A, by displaying one or two selected from the graph shown in FIG. 12B and the graph shown in FIG. 12C, the user can easily ascertain the trial conditions of each trial iteration.

In addition to the graph of FIG. 12B, the table of FIG. 13 may be displayed. Thereby, the user can easily ascertain which design item is tried in each trial iteration.

Figure 14A:
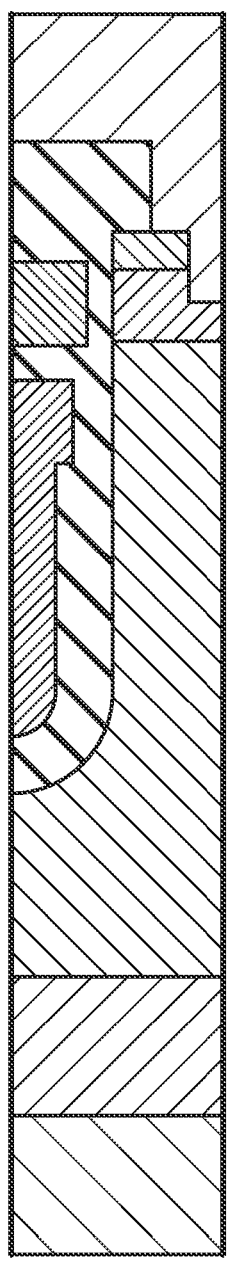
Figure 14B:
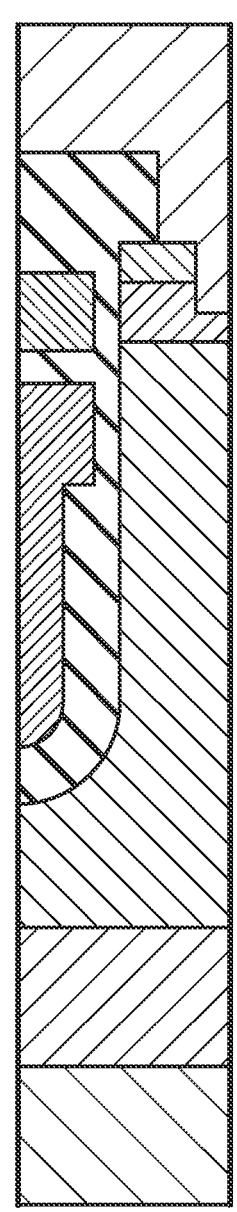

The output part 18 may display a component drawing of the semiconductor element such as that shown in FIG. 14A or FIG. 14B. The output part 18 displays the component drawing together with the display of the graph of FIG. 12A. The displayed structure reflects design values for which the best score is obtained up to that time. For example, FIG. 14A is a component drawing ST1 of the semiconductor element at 200 trial iterations. FIG. 14B is a component drawing ST2 of the semiconductor element at 600 trial iterations. By the display of the component drawing, the user can easily ascertain the structure for which the best score is obtained.

In the example shown in FIGS. 12A to 12C, the trial iterations are equal between the design items. The trial iterations may be different from each other between the design items. It is favorable for the trial iterations of an important design item to be set to be greater than the trial iterations of the other design items. For example, the trial iterations of the drift layer concentration are set to be greater than the trial iterations of the other design items. The likelihood of obtaining more desirable characteristic values with fewer trial iterations can be increased thereby.

When repeating the trials, the range of the design values that are searched may be modified according to the obtained score. For example, a reference value for the score is preset by the user separately from the target value of the end condition. Or, the design value calculator 14 may set a reference value based on the target value of the score. When repeating the trials, the design value calculator 14 reduces the search range of the design values when the best score reaches the reference value. For example, the design value calculator 14 reduces the search range of the design values of all of the design items that are the search object.

The proportion of the reduced search range is preset by the user. For example, when the score reaches the reference value, at least one of the upper limit or the lower limit of the search range is changed by a prescribed proportion. Or, the search range may be reduced based on the acquisition function. For example, the design value calculator 14 excludes the range in which the output of the acquisition function is small from the search range. The likelihood of obtaining more desirable characteristic values with fewer trial iterations can be increased thereby.

In the example, the characteristics are better as the score decreases. For example, a first score based on a first breakdown voltage value is less than a second score based on a second breakdown voltage value. The first score based on a first on-resistance is less than the second score based on a second on-resistance. The first breakdown voltage value is greater than the second breakdown voltage value. The first on-resistance is less than the second on-resistance.

The score may increase as the characteristics improve. For example, the first score based on the first breakdown voltage value is greater than the second score based on the second breakdown voltage value. The first score based on the first on-resistance is greater than the second score based on the second on-resistance. The first breakdown voltage value is greater than the second breakdown voltage value. The first on-resistance is less than the second on-resistance.

Second Modification

Figure 15:
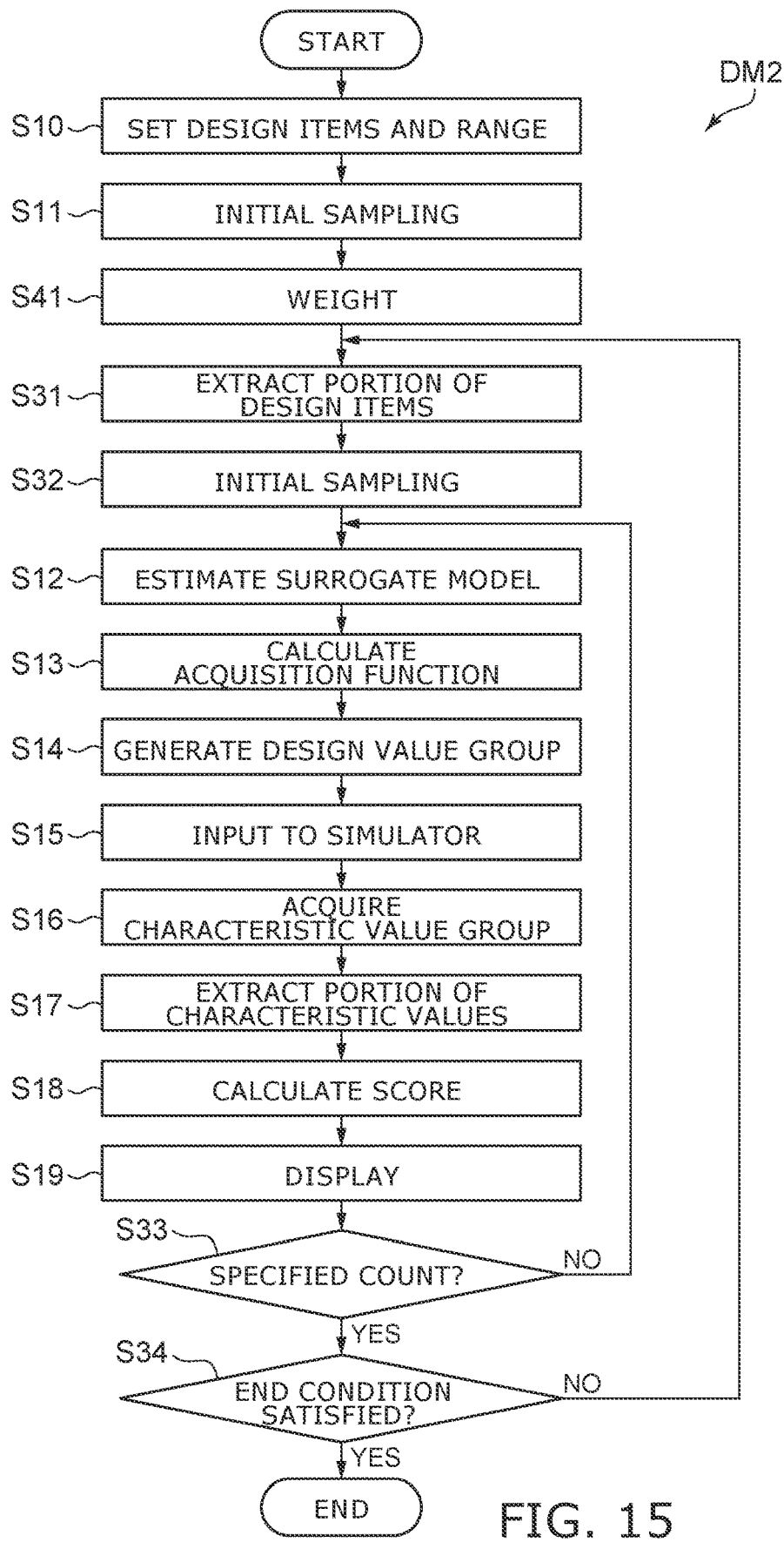
FIG. 15 is a flowchart illustrating a design support method according to a second modification of the embodiment.

FIG. 15 is a flowchart illustrating a design support method according to a second modification of the embodiment.

In the design support method DM2 shown in FIG. 15, the design items that are extracted in step S31 are weighted.

In the design support method DM2, the design value calculator 14 performs weighting of the design items after steps S10 and S11 (step S41). For example, larger weights are set for the more important design items. The design value calculator 14 extracts the design item to be searched according to the probability. The probability is set according to the weight. The probability of being extracted is high when the weight is large. Thereafter, steps S31, S32, S12 to S19, S33, and S34 are performed similarly to the design support method DM2 shown in FIG. 10.

According to the design support method, the important design items are easily extracted. For example, the weight of the impurity concentration (particularly the drift layer concentration) in the semiconductor layer that greatly affects the characteristic values is set to be greater than the weights of the other design items. The likelihood of obtaining more desirable characteristic values can be increased.

For example, a portion of the design items is extracted in the design support method DM2. The first processing set is executed for a portion of the design values that indicates the values of the extracted portion of the design items. After the first processing set, another portion of the design items is extracted. The second processing set is executed for another portion of the design values that indicates the values of the extracted other portion of the design items. The probability of extracting the portion of the design items is different from the probability of extracting the other portion of the design items. For example, one design value (a first design value) of the portion of the design items indicates the impurity concentration in a semiconductor layer. The probability of extracting the portion of the design items is greater than the probability of extracting the other portion of the design items.

Or, the probability of extracting the design items may be the same, and the specified count in step S33 may be changed according to the weight. The specified count is set higher as the weight increases. According to the design support method, the trial iterations are increased for the important design items. The likelihood of obtaining more desirable characteristic values can be increased.

For example, in the design support method DM2, the number of times that the first processing set is repeated is different from the number of times that the second processing set is repeated. When the portion of the design items includes the impurity concentration of a semiconductor layer, it is favorable for the number of times that the first processing set is repeated to be greater than the number of times that the second processing set is repeated.

Third Modification

Figure 16:
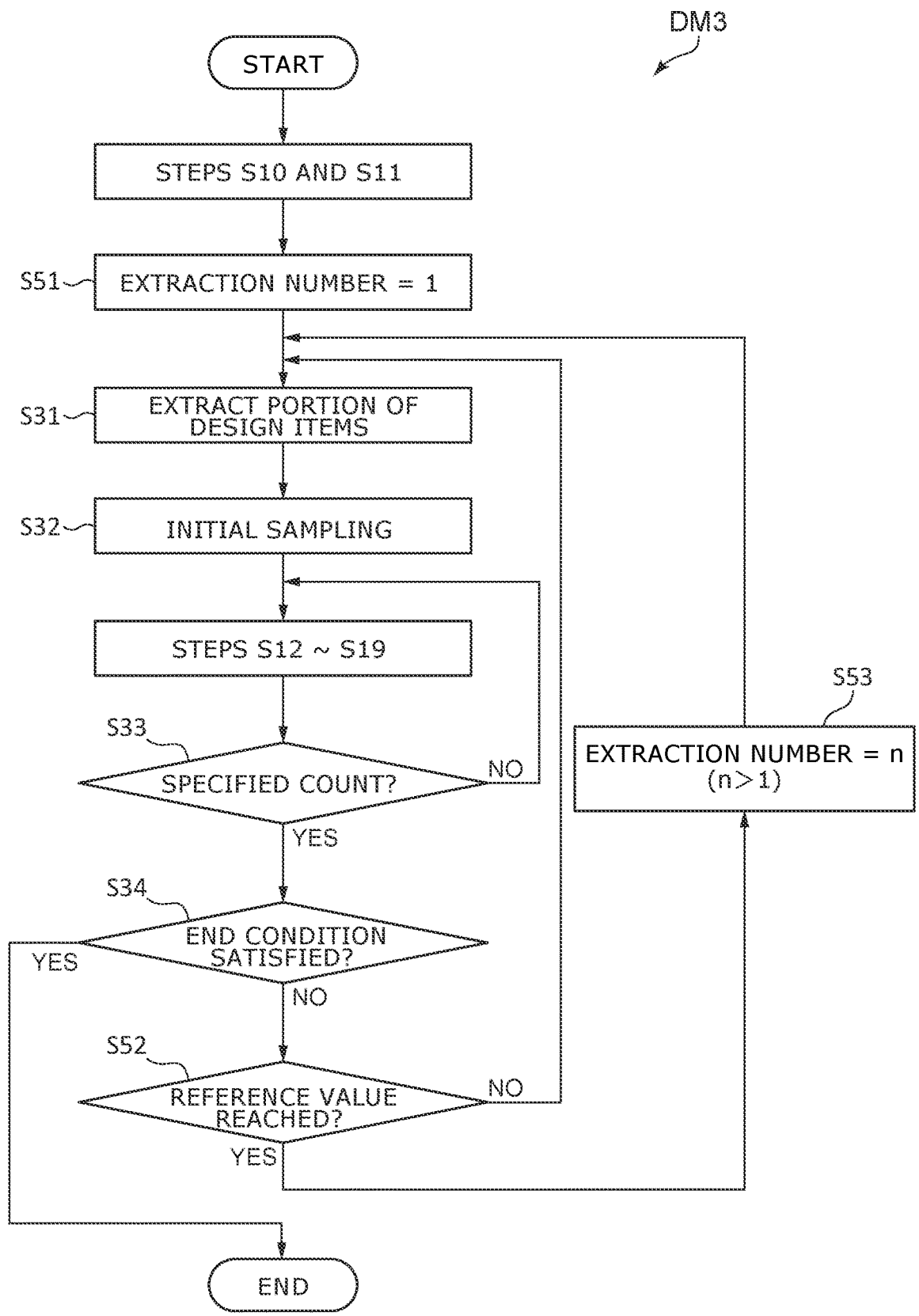
FIG. 16 is a flowchart illustrating a design support method according to a third modification of the embodiment.

FIG. 16 is a flowchart illustrating a design support method according to a third modification of the embodiment.

In a design support method DM3 according to the third modification, steps S10 and S11 are performed similarly to the design support method DM0 shown in FIG. 4. The number of the extracted design items is set to "1" (step S51). Steps S31, S32, S12 to S19, S33, and S34 are performed similarly to the design support method DM1 shown in FIG. 10. In step S31 directly after step S51, one design item is extracted. When it is determined that the end condition is not satisfied in step S34, the design value calculator 14 determines whether or not the score has reached the reference value (step S52). For example, the best score obtained up to that time is referred to in step S52. The reference value is preset by the user. Or, the design value calculator 14 may set the reference value based on the target value of the score.

When the score has reached the reference value, the number of the extracted design items is set to "n" (step S53). n is an integer that is greater than 1. Thereafter, n design items are extracted in step S31. One design item is extracted in step S31 until the score reaches the reference value.

According to the design support method DM3, compared to the design support method DM2, the initial search can be more quickly completed. Compared to the design support method DM2, a local optimal solution is less likely in the subsequent search.

For example, in the design support method DM3, the first processing set is performed for a portion of the design values; and the second processing set is executed for another portion of the design values. The second processing set is performed after the first processing set. In the first processing set, the portion of the design values is calculated based on the acquisition function. In the second processing set, the other portion of the design values is calculated based on the acquisition function. The number of design values included in the portion of the design values is greater than the number of design values included in the other portion of the design values. The first processing set is performed before the score reaches the reference value. The second processing set is performed after the score reaches the reference value.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, embodiments of the invention are described with reference to specific examples. However, the invention is not limited to these specific examples. For example, one skilled in the art may similarly practice the invention by appropriately selecting specific configurations of components included in the design support system such as the extractor, the score calculator, the Bayesian inference part, the acquisition function calculator, the design value calculator, the file generator, the command generator, the input part, the output part, and the memory, etc., from known art; and such practice is within the scope of the invention to the extent that similar effects can be obtained.

two or more components of the specific examples may be combined within the extent of technical feasibility and are included in the scope of the invention to the extent that the purport of the invention is included.

Moreover, all design support methods, design support systems, programs, and non-transitory computer-readable storage mediums practicable by an appropriate design modification by one skilled in the art based on the design support methods, the design support systems, the programs, and the non-transitory computer-readable storage mediums described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A design support method, comprising:
inputting a design value group to a simulator, the design value group including a plurality of design values relating to a semiconductor element;
acquiring a characteristic value group output from the simulator according to the input of the design value group, the characteristic value group including a plurality of characteristic values of the semiconductor element, the plurality of characteristic values including a first characteristic value and a second characteristic value, the first characteristic value indicating an on-resistance, the second characteristic value indicating a breakdown voltage;
calculating an acquisition function of a Bayesian inference from history data including not less than one data set, the data set including the design value group and a score, the score being calculated by inputting a portion of the characteristic value group to a first function, the portion of the characteristic value group including the first and second characteristic values; and
generating a new design value group based on the acquisition function, wherein:
   a processing set includes the inputting of the design value group to the simulator, the acquiring of the characteristic value group, the calculating of the acquisition function, and the generating of the new design value group,
   the processing set is repeatedly executed, and
   a plurality of the processing sets includes a first processing set and a second processing set,
   in the first processing set:
      a portion of the plurality of design values is calculated based on the acquisition function; and
      the new design value group is generated to include the portion of the plurality of design values and fixed remaining design values of the plurality of design values, and
   in the second processing set:
      an other portion of the plurality of design values is calculated based on the acquisition function; and
      the new design value group is generated to include the other portion of the plurality of design values and fixed remaining design values of the plurality of design values.

2. The method according to claim 1, wherein a plurality of the first processing sets and a plurality of the second processing sets are executed.

3. The method according to claim 2, wherein an execution count of the first processing set is more than an execution count of the second processing set.

4. The method according to claim 3, wherein the portion of the plurality of design values includes a first design value indicating an impurity concentration of a semiconductor layer of the semiconductor element.

5. The method according to claim 1, wherein a possible range of at least a portion of the plurality of design values is reduced when the score reaches a reference value.

6. The method according to claim 1, wherein the second processing set is executed after the first processing set, and a number of the design values included in the other portion of the plurality of design values is greater than a number of the design values included in the portion of the plurality of design values.

7. The method according to claim 6, wherein the first processing set is executed before the score reaches a reference value, and the second processing set is executed after the score has reached the reference value.

8. The method according to claim 1, wherein the portion of the plurality of design values respectively indicates values of a portion of a plurality of design items,
the other portion of the plurality of design values respectively indicates values of an other portion of the plurality of design items,
the first processing set is executed after the portion of the plurality of design items is extracted,
the second processing set is executed after the other portion of the plurality of design items is extracted, and
a probability of the portion of the plurality of design items being extracted is greater than a probability of the other portion of the plurality of design items being extracted.

9. The method according to claim 8, wherein the portion of the plurality of design values includes a first design value indicating an impurity concentration of a semiconductor layer of the semiconductor element.

10. The method according to claim 1, wherein a number of the design values included in the portion of the plurality of design values in the first processing set is 1, and
a number of the design values included in the other portion of the plurality of design values in the second processing set is 1.

11. The method according to claim 1, wherein an execution count of the processing sets is output, and the score when each of the processing sets is executed is output.

12. The method according to claim 1, wherein the design value group includes the design value of at least one selected from the group consisting of an impurity concentration of a semiconductor layer of the semiconductor element, a thickness of the semiconductor layer, and a pitch of a gate electrode of the semiconductor element.

13. The method according to claim 1, wherein the characteristic value group further includes the characteristic value of at least one selected from the group consisting of a switching charge, a gate accumulated charge, an output charge, a gate-drain accumulated charge, a gate-source accumulated charge, a channel amount, and a threshold voltage.

14. A design support system, comprising:
a processing device configured to
   input a design value group to a simulator, the design value group including a plurality of design values relating to a semiconductor element,
   acquire a characteristic value group output from the simulator according to the input of the design value group, the characteristic value group including a plurality of characteristic values of the semiconductor element, the plurality of characteristic values including a first characteristic value and a second characteristic value, the first characteristic value indicating an on-resistance, the second characteristic value indicating a breakdown voltage,
   calculate an acquisition function of a Bayesian inference from a history data including not less than one data set, the data set including the design value group and a score, the score being calculated by inputting a portion of the characteristic value group to a first function, the portion of the characteristic value group including the first and second characteristic values, and
   generate a new design value group based on the acquisition function,
wherein:
   the processing device repeatedly executes a processing set, and
   the processing set includes the inputting of the design value group to the simulator, the acquiring of the characteristic value group, the calculating of the acquisition function, and the generating of the new design value group, and
   a plurality of the processing sets includes a first processing set and a second processing set,
   in the first processing set:
      a portion of the plurality of design values is calculated based on the acquisition function; and
      the new design value group is generated to include the portion of the plurality of design values and fixed remaining design values of the plurality of design values, and in the second processing set:
an other portion of the plurality of design values is calculated based on the acquisition function; and
the new design value group is generated to include the other portion of the plurality of design values and fixed remaining design values of the plurality of design values.

15. A non-transitory computer-readable storage medium storing a program,
the program causing the processing device to
input a design value group to a simulator, the design value group including a plurality of design values relating to a semiconductor element,
acquire a characteristic value group output from the simulator according to the input of the design value group, the characteristic value group including a plurality of characteristic values of the semiconductor element, the plurality of characteristic values including a first characteristic value and a second characteristic value, the first characteristic value indicating an on-resistance, the second characteristic value indicating a breakdown voltage,
calculate an acquisition function of a Bayesian inference from a history data including not less than one data set, the data set including the design value group and a score, the score being calculated by inputting a portion of the characteristic value group to a first function, the portion of the characteristic value group including the first and second characteristic values, and
generate a new design value group based on the acquisition function,
wherein:
the processing device is caused to repeatedly execute a processing set,
the processing set includes the inputting of the design value group to the simulator, the acquiring of the characteristic value group, the calculating of the acquisition function, and the generating of the new design value group, and
a plurality of the processing sets includes a first processing set and a second processing set,
in the first processing set:
a portion of the plurality of design values is calculated based on the acquisition function; and
the new design value group is generated to include the portion of the plurality of design values and fixed remaining design values of the plurality of design values, and
in the second processing set:
an other portion of the plurality of design values is calculated based on the acquisition function; and
the new design value group is generated to include the other portion of the plurality of design values and fixed remaining design values of the plurality of design values.

* * * * *